United States Patent
Connell et al.

(10) Patent No.: US 8,126,422 B2
(45) Date of Patent: Feb. 28, 2012

(54) RECEIVER HAVING VOLTAGE-TO-CURRENT AND CURRENT-TO-VOLTAGE CONVERTERS

(75) Inventors: Lawrence E. Connell, Naperville, IL (US); Joseph P. Golat, Algonquin, IL (US); Joseph M. Ingino, Libertyville, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 922 days.

(21) Appl. No.: 12/103,452

(22) Filed: Apr. 15, 2008

(65) Prior Publication Data

US 2009/0258623 A1    Oct. 15, 2009

(51) Int. Cl.
*H04B 1/16* (2006.01)
(52) U.S. Cl. .................... 455/338; 455/253.2; 341/144
(58) Field of Classification Search .............. 455/280, 455/338, 339, 341, 253.1, 253.2; 341/143, 341/144, 155, 156
See application file for complete search history.

(56) References Cited

U.S. PATENT DOCUMENTS

| | | | | |
|---|---|---|---|---|
| 5,606,731 A | * | 2/1997 | Pace et al. | 455/260 |
| 5,930,696 A | * | 7/1999 | Tzuang et al. | 455/311 |
| 7,493,097 B2 | * | 2/2009 | Ismail et al. | 455/285 |

* cited by examiner

*Primary Examiner* — Christian Hannon (57) ABSTRACT

A receiver (300) comprises an antenna input (301), a filter (302), a voltage-to-current converter (303), a down frequency conversion mixer (304), and a current-to-voltage converter (305). The antenna input operably couples to an antenna. The filter has a filter input that operably couples to the antenna input and can further have a filter output. The voltage-to-current converter has an input that is operably coupled to the filter output and can further have a voltage-to-current converter output. The down frequency conversion mixer has a mixer input that is operably coupled to the voltage-to-current converter output and can further have a mixer output. And the current-to-voltage converter has an input that is operably coupled to the mixer output and can further have a current-to-voltage converter output. By one approach, this current-to-voltage converter comprises an amplifier having a current gain of substantially unity or less.

21 Claims, 7 Drawing Sheets

RECEIVER HAVING VOLTAGE-TO-CURRENT AND CURRENT-TO-VOLTAGE CONVERTERS

BACKGROUND

1. Field

This invention relates generally to wireless receivers and more particularly to wireless receivers configured, at least in part, as an integrated circuit.

2. Related Art

Wireless receivers of various kinds are known in the art including a variety of receivers that are realized, wholly or partially, as an integrated circuit. There are, however, at least some application settings where existing approaches in this regard are viewed as requiring, for example, too much space on the integrated circuit. This, in turn, can stymie product designers who, for any number of reasons, seek a receiver having a smaller platform footprint.

Consider, for example, a wireless receiver having a radio frequency (RF) front end comprising a low-noise transconductor (such as a voltage-to-current converter) that drives a switching mixer to thereby yield a baseband (or low intermediate frequency) output in the current domain. A following transimpedance amplifier (such as a current-to-voltage converter) can then receive that output and convert the result into the voltage domain. In order to maintain a differential voltage as this output, the components as comprise these elements must themselves be fully differential. In the past, this has necessitated the use of feedback paths (one for each side of the differential output) that each include a capacitor (that is, the feedback path flows through the capacitor). Capacitors, of course, often comprise one of the larger components to successfully form in an integrated circuit and hence contribute greatly to the overall resultant size of the receiver.

Eliminating one or both of these capacitors to reduce the size of the receiver poses numerous design challenges. It is important, for example, that the solution not unduly impact the performance of the aforementioned low-noise transconductor or the switching mixer. It is also important that the component area at issue present a low impedance to the switching mixer. These and numerous other problems have generally frustrated the development of suitable solutions in this application setting.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a receiver can be configured and arranged to comprise an antenna input, a filter, a voltage-to-current converter, a down frequency conversion mixer, and a current-to-voltage converter. The antenna input can be configured and arranged to operably couple to an antenna. The filter can have a filter input that operably couples to the antenna input and can further have a filter output. The voltage-to-current converter can be configured and arranged to have an input that is operably coupled to the filter output and can further have a voltage-to-current converter output. The down frequency conversion mixer can be configured and arranged to have a mixer input that is operably coupled to the voltage-to-current converter output and can further have a mixer output. And the current-to-voltage converter can be configured and arranged to have an input that is operably coupled to the mixer output and can further have a current-to-voltage converter output. By one approach, this current-to-voltage converter comprises an amplifier having a current gain of substantially unity or less.

By one approach, the current-to-voltage converter output comprises a differential output having at least one resistor connected there across. This output can also connect to at least one capacitor, but by one approach, does not feed back to the input of the current-to-voltage converter via this or any other capacitor. By this approach, it can be seen and appreciated that the size of the receiver dedicated to capacitors can be reduced by at least fifty percent (by at least halving the number of capacitors that are deployed in conjunction with the output of the current-to-voltage converter).

By one approach, the receiver can also comprise an integrator that operably couples to the current-to-voltage converter output. This integrator can have an output that is operably coupled, in turn, via a feedback path to provide a feedback signal to the input (or the output) of the current-to-voltage converter. Again in keeping with the above, this feedback path need not comprise, even in part, a capacitor to thereby greatly reduce space requirements in the integrated circuit for such functionality.

These teachings are readily employed in a variety of useful application settings and configurations. Typical design and operational requirements are readily met while also achieving significant reductions in size due, in large part, to the reduction in the number of utilized capacitors. These teachings are also leverageable, for example, to significantly reduce close-in harmonics as can occur as a function of the down conversion process. In sum and substance, the teachings herein can be utilized to provide a receiver having a plurality of parallel transconductor/mixer/transimpedance amplifier paths as described to thereby aid and assist in the rejection of unwanted harmonics.

Those skilled in the art will further appreciate that these teachings are readily accomplished using existing fabrication techniques and technologies and are highly scalable to suit the needs of various fabrication methodologies and application settings. These teachings are also efficient in design and operation, making the described approaches highly suitable for use in a variety of application settings.

Figure 1:
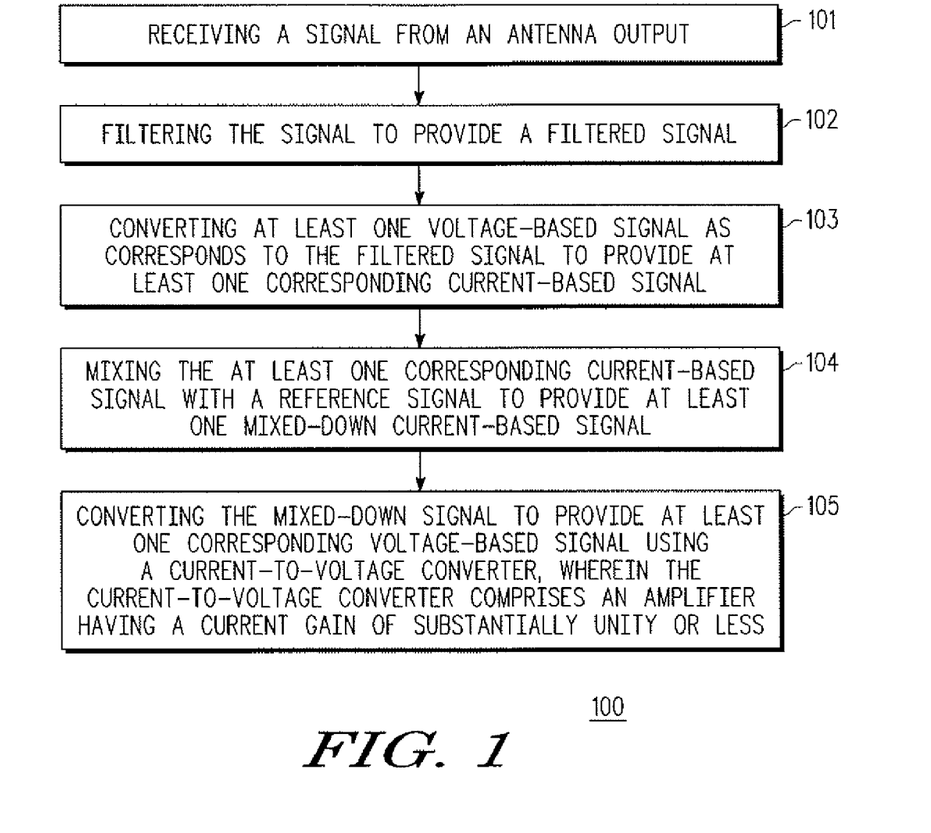
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process that is compatible with many of these teachings will now be presented. Those skilled in the art will recognize and appreciate that this process 100 may be carried out by, for example, a receiver such as a wireless receiver having an integrated circuit form factor.

This process 100 provides for receiving 101 a signal from an antenna output. This signal may comprise, for example, a received wireless transmission such as a high frequency carrier that bears information to be recovered by the receiver. This process 100 then provides for filtering 102 the signal to provide a filtered signal.

This process 100 then next provides for converting 103 at least one voltage-based signal as corresponds to the filtered signal to provide at least one corresponding current-based signal. This can comprise, for example, a differential current output. The process 100 then provides for mixing 104 the at least one corresponding current-based signal with a reference signal to provide at least one mixed-down current-based signal. As those skilled in the art will understand, the signal provided at the antenna output will typically comprise a high frequency carrier signal (typically ranging from some many thousands of cycles per second to millions or even billions of cycles per second) having an information signal modulated therewith. To facilitate recovering that information signal, one often reduces that carrier signal to some more manageable and useful level. This often comprises reducing that carrier frequency to baseband, hence effectively leaving only the information content. The described mixing step is intended to facilitate just such functionality.

This process 100 then provides for converting 105 the mixed-down current signal to provide at least one corresponding voltage-based signal using a current-to-voltage converter. By one approach, and as will be discussed in more detail below, this current-to-voltage converter comprises an amplifier having a current gain of substantially unity or less. By one approach, this can comprise providing an amplifier having a current gain that is within approximately ten percent of unity. In addition, as desired, this can further comprise employing a converter having at least one capacitor connected across an output of the current-to-voltage converter, but wherein that output does not feed back to an input of the current-to-voltage converter via a capacitor. Examples in this regard and corresponding useful benefits are provided below in more detail.

Figure 2:
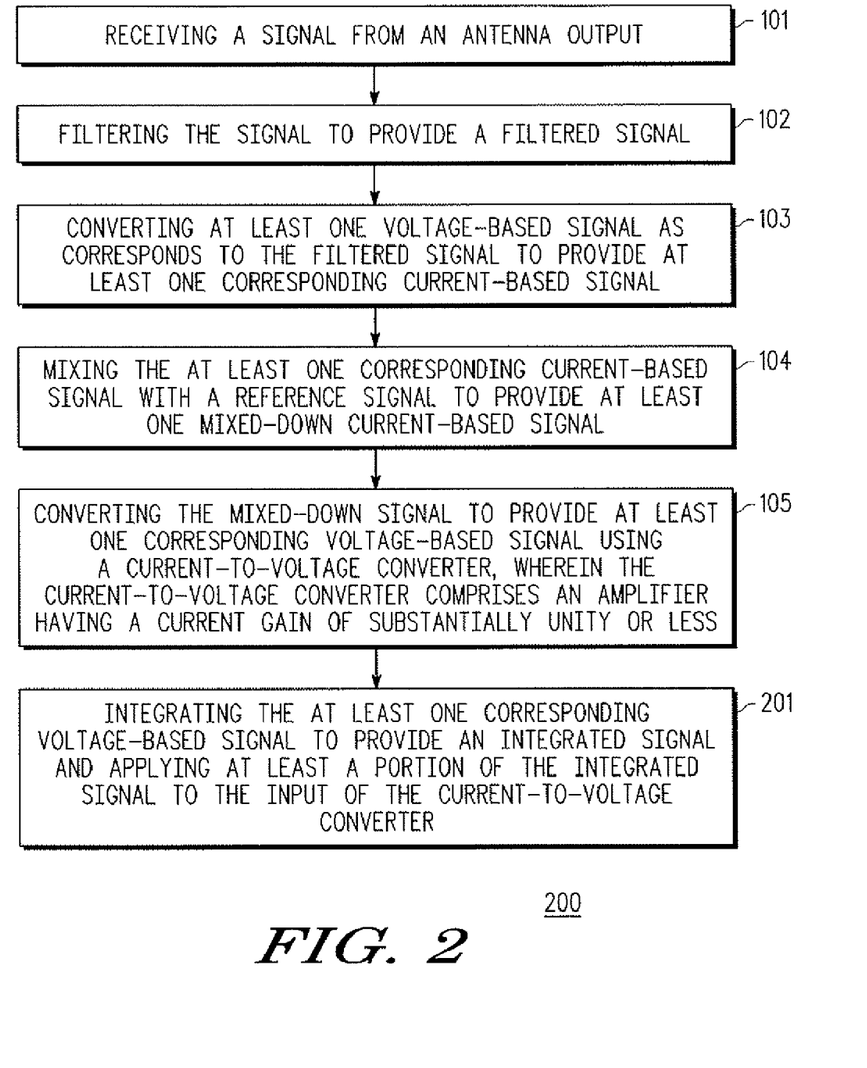
FIG. 2 comprises a flow diagram as configured in accordance with various embodiments of the invention.

By one approach, and referring now to FIG. 2, a corresponding process 200 can provide for the same steps as have been set forth plus an additional step of integrating 201 the at least one corresponding voltage-based signal to provide an integrated signal and applying at least a portion of the integrated signal to the input of the current-to-voltage converter. If desired, this can also comprise applying at least a portion of the integrated signal to the input of the current-to-voltage converter without a capacitor. Again, examples in this regard are provided further below.

Figure 3:
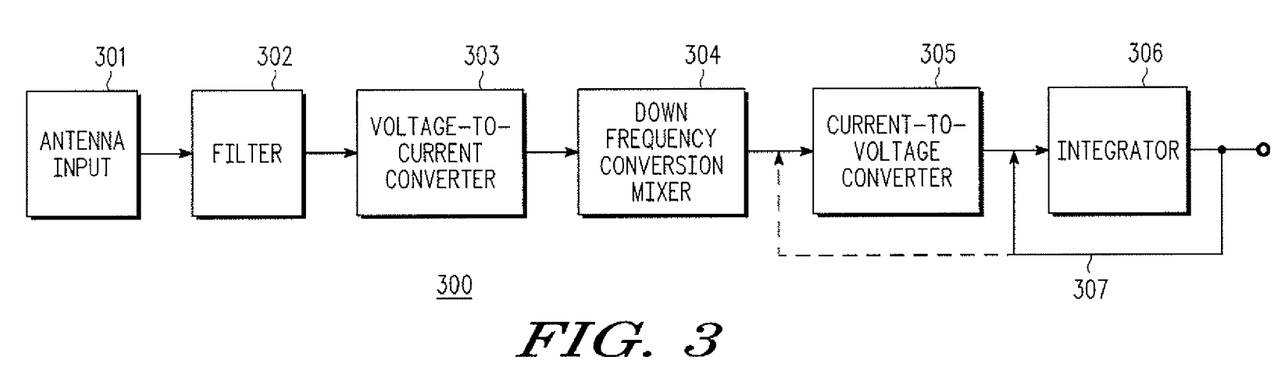
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example, a receiver 300 comprises an antenna input 301 that is configured and arranged to operably couple to an antenna (not shown) to thereby receive the aforementioned wireless signal. The output of this antenna input 301 operably couples to the filter input of a filter 302. This filter 302 can comprise, for example, a duplexor or a SAW. It will be understood, however, that as used herein in this context, such a filter 302 does not comprise a low noise amplifier (LNA) per se. This filter 302 in turn has a filter output that operably couples to the input of a transconductor comprising a voltage-to-current converter 303 having a voltage-to-current converter output. This voltage-to-current converter 303 can comprise, for example, an inductively degenerated common source amplifier as is known in the art. The voltage-to-current converter output operably couples to a mixer input of a down frequency conversion mixer 304 having a mixer output that operably couples to an input of a following transimpedance amplifier comprising a current-to-voltage converter 305 having, in this illustrative example, a common gate amplifier with a current gain of substantially unity or less.

This illustrative embodiment also provides for an integrator 306 that operably couples to the current-to-voltage converter output. As illustrated, the integrator output is operably coupled via a feedback path to either the output of the current-to-voltage converter 305 or to the input of the current-to-voltage converter 305, as desired. As suggested earlier, this feedback path does not comprise, even in part, a capacitor. This, in turn, permits a considerable reduction in overall size for the receiver 300.

Figure 4:
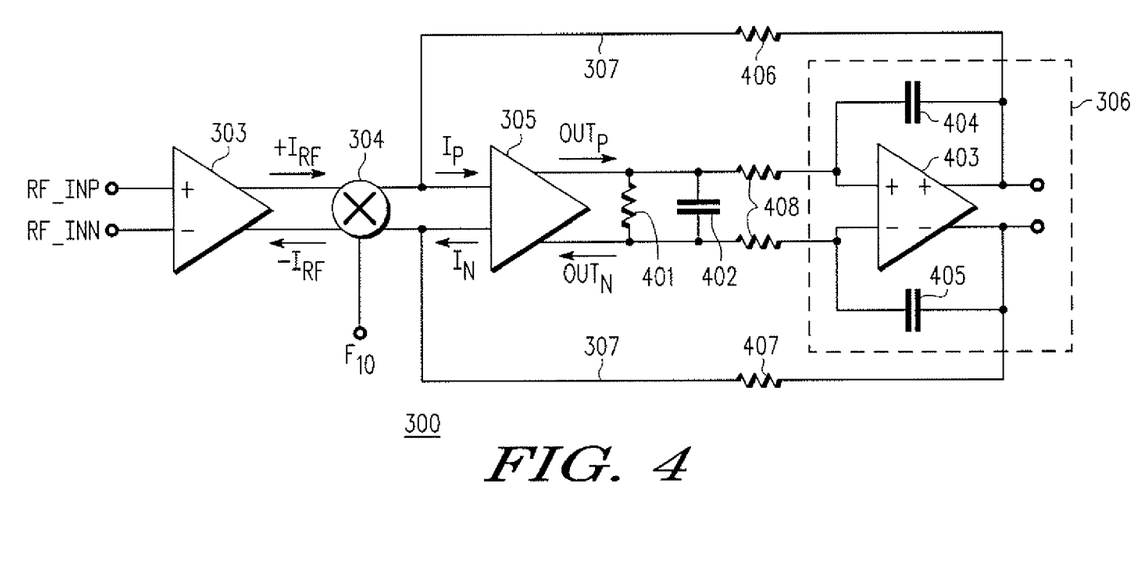
FIG. 4 comprises a schematic diagram as configured in accordance with various embodiments of the invention.

Referring now to FIG. 4, a more specific exemplary instantiation of such a receiver 300 will be presented and described. Those skilled in the art will recognize and understand that this example is intended to serve only in an illustrative capacity and is not intended to comprise an exhaustive listing of all possibilities in this regard and hence should not be viewed as being offered with any intention that these examples are to be viewed as comprising limitations with respect to the scope and application of these teachings.

In this example, the receiver 300 provides the aforementioned filtered received wireless signals (denoted here as rf_inp and rf_inn to refer to the positive and negative aspects of the incoming radio frequency content) to the corresponding inputs of a voltage-to-current converter 303. Generally speaking, and as per the needs of many application settings, this voltage-to-current converter 303 can comprise a low-noise transconductor that can again comprise an inductively degenerated common source amplifier. Various approaches are known in the art in this regard. As these teachings are not overly sensitive to any particular selection in this regard, for the sake of brevity and the preservation of clarity, further elaboration in this regard will not be presented here.

The differential current output of the voltage-to-current converter 303 (denoted here as $+i_{rf}$ and $-i_{rf}$) is then provided to the input of mixer 304 that also receives a reference signal (denoted here as $f_{lo}$) from a suitable local oscillator. Such mixers, local oscillators, and their manner of use are all well known in the art and require no further description here aside from noting that the mixer 304 may comprise, in at least some application settings, a switching (i.e., commutating) style of mixer. The output of this mixer 304, in this illustrative embodiment, comprises a baseband signal though other possibilities exist. For example, this receiver 300 may comprise a so-called low-IF (for low Intermediate Frequency) receiver; in such a case, the output of the mixer 304 could comprise a low frequency signal rather than a baseband signal (represented here as $i_p$ and $i_n$). Again, such choices and technologies are well known in the art.

Figure 5:
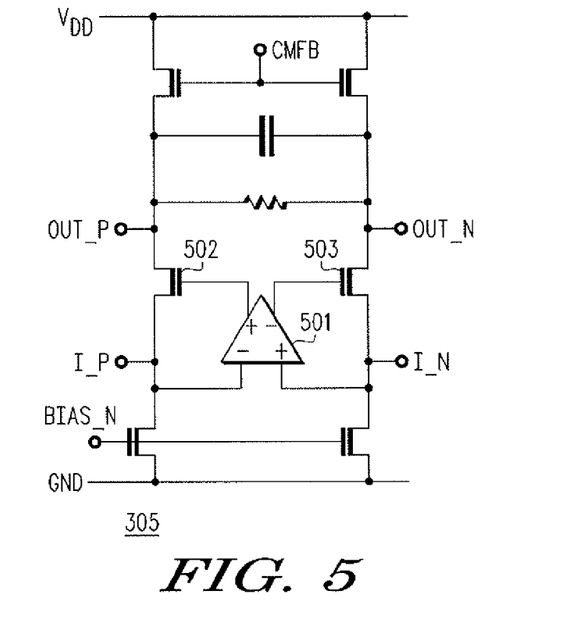
FIG. 5 comprises a schematic diagram as configured in accordance with various embodiments of the invention.

A next transimpedance amplifier stage, this time comprising the aforementioned current-to-voltage converter 305, receives this baseband differential current output of the mixer 304. As noted above, this current-to-voltage converter 305 comprises an amplifier with a current gain of substantially unity or less. For the sake of simplicity, the remainder of this illustrative example will presume that the current gain is equal to "1." There are various ways by which such a transimpedance amplifier might be realized. One illustrative (though non-limiting) example in this regard appears in FIG. 5. In a configuration such as the one depicted, the feedback provided by the gain-boosting amplifier 501 increases the current gain performance of the common-gate devices 502 and 503 to thereby ensure a low input impedance. This low impedance is then transferred through a passive switching mixer 304 to the output of the transconductor 303. This maximizes conversion gain by causing the majority of signal current generated by the transconductor 303 to be steered through the mixer 304. Also, this low impedance maintains current mode operation through the mixer 304 by minimizing the signal voltage swing at the transconductor 303 output and significantly improves linearity. It may further be noted that stability issues can be at least largely avoided by employing a single stage (i.e., a single pole) architecture for the gain-boosting amplifier. Those skilled in the art will recognize and appreciate that there are other ways by which the current-to-voltage converter 305 can be realized to suite the needs and/or opportunities as tend to characterize a given application setting.

Figure 6:
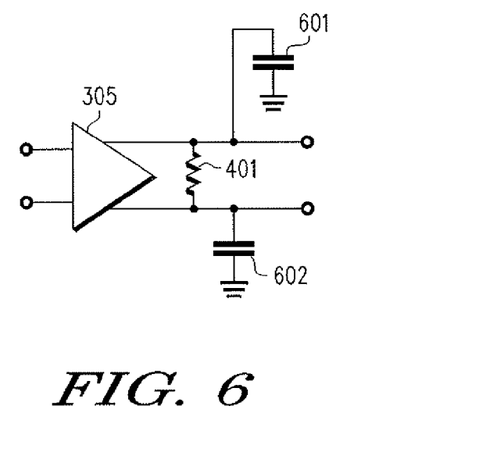
FIG. 6 comprises a schematic diagram as configured in accordance with various embodiments of the invention.

Referring again to FIG. 4, in this illustrative embodiment, the differential output of the current-to-voltage converter 305 has at least one resistor 401 connected there across. This current-to-voltage converter 305 develops an output voltage by steering its input current, or the baseband output current the mixer 304, across this resistor 401. In addition (or, if desired, in lieu thereof), a capacitor 402 can also connect across the differential output of the current-to-voltage converter 305 in order to provide filtering or attenuation of out-of-band blockers. When including such a capacitor 402, those skilled in the art will note that this capacitor 402 does not comprise part of a feedback path 307 as described in more detail below in that a feedback signal does not propagate through that capacitor 402. Those skilled in the art will recognize that other possibilities exist in this regard. For example, and referring momentarily to FIG. 6, instead of (or in addition to) providing a capacitor across the differential output ports of the current-to-voltage converter 305, each such output port can couple to a corresponding grounded capacitor 601/602, respectively.

In any event, in this illustrative example the differential output of the current-to-voltage converter 305 also operably couples via a pair of in-line resistors 408 to the input of an integrator 306. In this illustrative example the integrator 306 generally comprises an operational amplifier 403 and two corresponding capacitors 404 and 405. Although these two capacitors 404 and 405 serve to couple the outputs of the operational amplifier 403 to the inputs of the operational amplifier 403, these capacitors 404 and 405 are properly viewed as comprising a part of the integrator 306 and are not to be viewed and considered as comprising a part of a feedback path as corresponds to the current-to-voltage converter 305 stage.

The aforementioned feedback paths 307 are shown, in this embodiment, to couple the differential outputs of the integrator 306, via corresponding resistors 406 and 407, to the corresponding inputs of the current-to-voltage converter 305. Such a configuration, of course, runs directly contrary to the teachings of the prior art and to ordinary common sense in that these feedback paths 307 include no capacitor(s). In the prior art large capacitance feedback capacitors are typically used to provide filtering and attenuation of out-of-band blockers. Instead, the single capacitor 402 referred to earlier, which couples across the differential outputs of the current-to-voltage converter 305 substitute in purpose and effect in this regard. This, in turn, results in a fifty percent reduction, in this embodiment of capacitance as compared to typical prior practices in this regard. As capacitors comprise a disproportionate share of space in an integrated circuit setting, this reduction of required capacitor space by fifty percent represents a very significant reduction in integrated circuit space requirements for such functionality.

Figure 7:
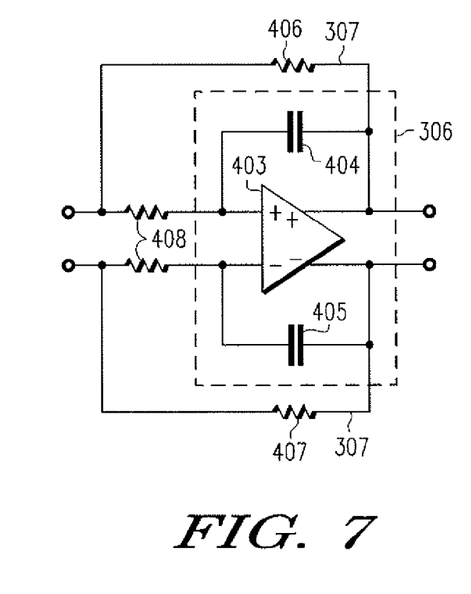
FIG. 7 comprises a schematic diagram as configured in accordance with various embodiments of the invention.
Figure 8:
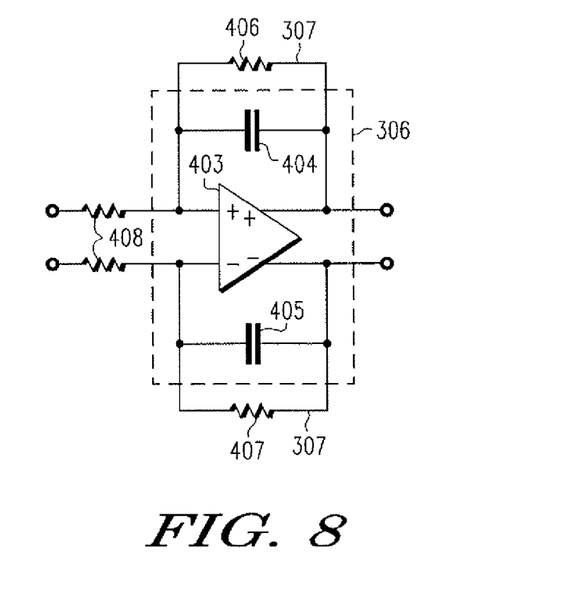
FIG. 8 comprises a schematic diagram as configured in accordance with various embodiments of the invention.

In the embodiment shown, the feedback paths 307 couple to the input of the current-to-voltage converter 305. Those skilled in the art will appreciate, however, that other possibilities exist in this regard. As one illustrative example in this regard, these feedback paths 307 can connect instead to the output side of the current-to-voltage converter 305. This can comprise connecting the feedback paths 307 on the current-to-voltage converter 305 side of the in-line resistors 408 that couple the output of the current-to-voltage converter 305 to the integrator 306 (as shown in FIG. 7) or this can comprise connecting the feedback paths 307 on the downstream side of those in-line resistors 408 (as shown in FIG. 8). Other possibilities may exist as well in a given embodiment depending upon the needs and/or opportunities as tend to characterize a given application setting.

For the above-described series of components (beginning with the voltage-to-current converter 303 and ending with the current-to-voltage converter 305), these teachings will also accommodate using a plurality of such stages in a single receiver. To illustrate, and referring now to FIG. 9, a series of N such stages (represented here by a first such stage 901 through an Nth such stage 902, where N will be understood to comprise an integer greater than one) can be connected in parallel with one another. So configured, the receiver comprises a plurality of voltage-to-current converters 303 that each have a voltage-to-current converter output that operably couples to a mixer input of a corresponding one of a plurality of down frequency conversion mixers 304 that each, in turn, have a corresponding mixer output that operably couples to an input of a corresponding one of a plurality of current-tovoltage converters 305 that each have an amplifier with a current gain of substantially unit or less as described above.

Figure 9:
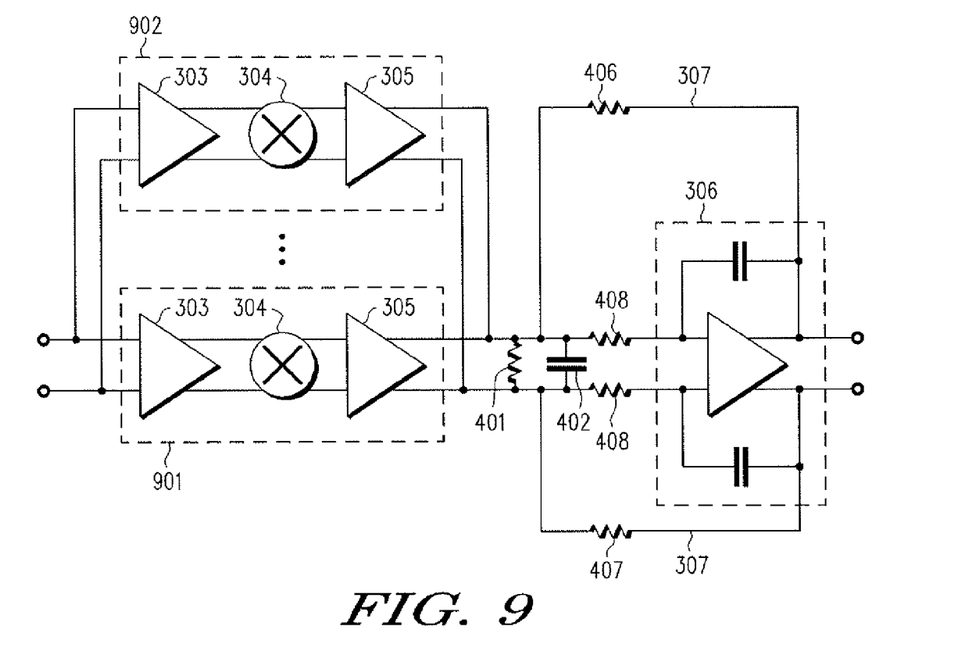
FIG. 9 comprises a schematic diagram as configured in accordance with various embodiments of the invention.

By this approach, the plurality of current-to-voltage converters 305 each have their current-to-voltage converter outputs coupled in common to provide a shared output as shown, which shared output can be configured as is otherwise described above. This can include coupling a capacitor 402 across this shared output and this can further comprise coupling this shared output to the input of a follow-on integrator 306. This can also comprise using feedback paths 307 that lack a capacitor between the output of the integrator 306 and the shared output (as shown).

Such a configuration can be useful in various application settings. By one approach, for example, such a configuration can aid in a reduction of unwanted harmonic content. Consider, for example, that commutating mixers such as those potentially employed in these teachings are often clocked by a local oscillator that provides a square wave. In such a case, the mixer can be sensitive to the down conversion of close-in harmonics into the baseband result (with particular sensitivity existing with respect to the $3^{rd}$ and $5^{th}$ order harmonics). For a commutating mixer a hard switching waveform such as a square wave is typically used to clock the mixer in order to achieve low noise. Unfortunately, a square wave has harmonics at odd multiples of its fundamental frequency and for some broadband receivers the square wave will mix unwanted channels which lie in the input passband and appear at the $3^{rd}$ and $5^{th}$ harmonic of the local oscillator.

Figure 10:
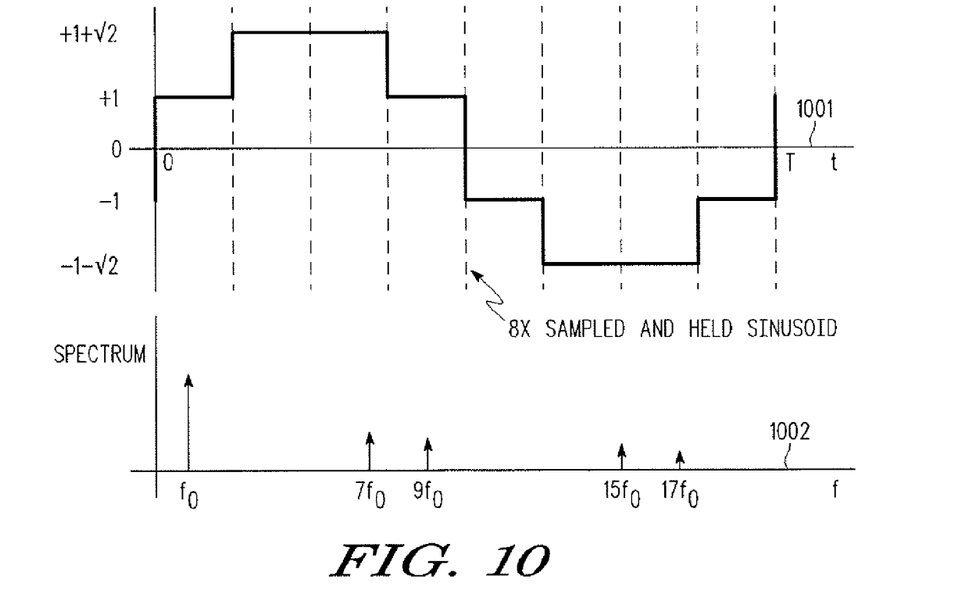
FIG. 10 comprises a time based and a frequency based graph in accordance with various embodiments of the invention.
Figure 11:
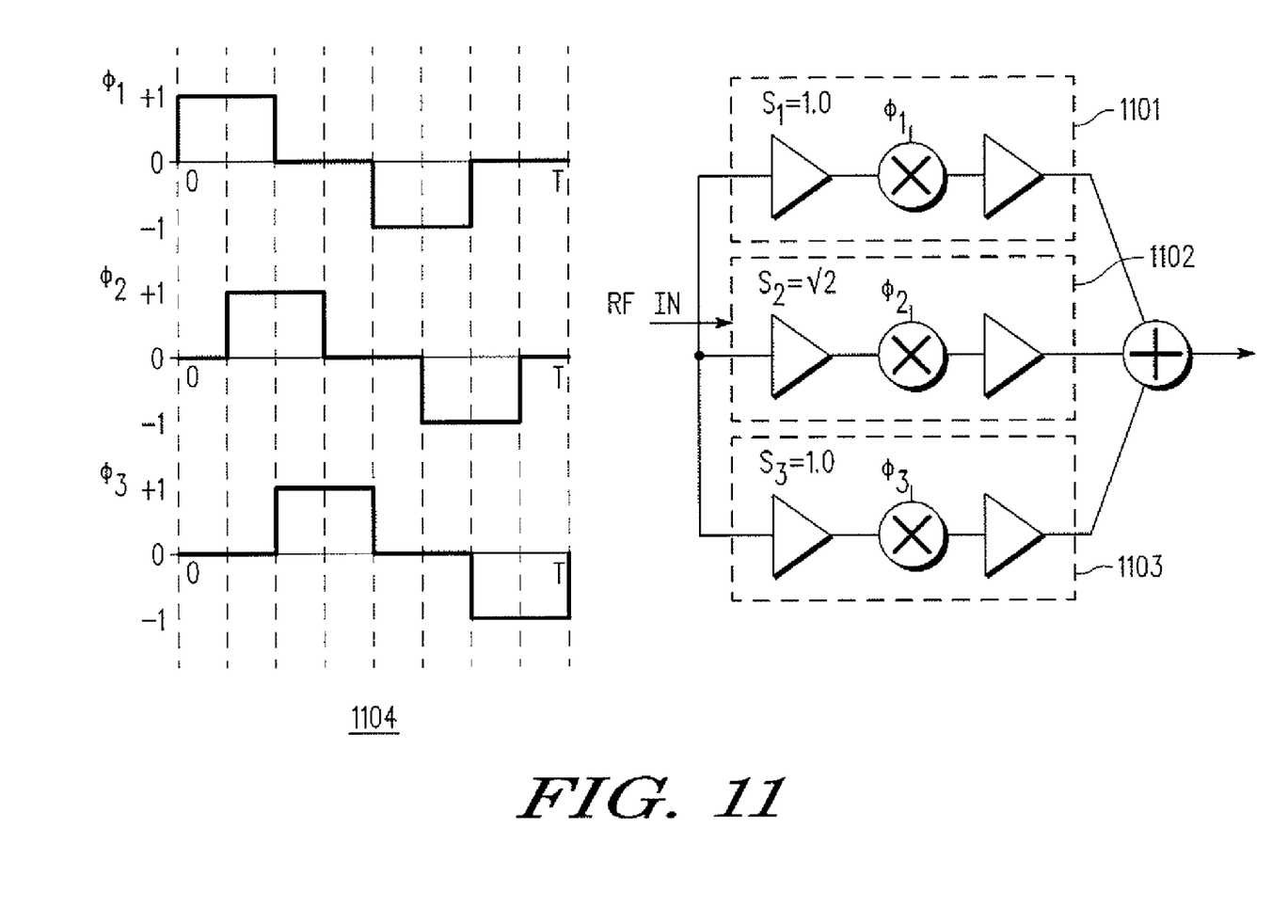
FIG. 11 comprises a block diagram and corresponding switching waveforms in accordance with various embodiments of the invention.

Fortunately, a hard switched mixer can be realized with the $3^{rd}$ and $5^{th}$ harmonics significantly suppressed by effectively multiplying the mixer input signal by a sampled and held sinusoid which is sampled at 8× the local oscillator frequency and ideally has no $3^{rd}$ and $5^{th}$ harmonics as shown in the time based and frequency based representations 1001 and 1002 of FIG. 10. This can be accomplished by connecting three weighted low noise mixer stages 1101, 1102, and 1103 in parallel and switching the current in each mixer stage as shown in the corresponding switching waveforms 1104 of FIG. 11. Those skilled in the art will recognize that although many application settings may benefit from a differential topology, a single-ended architecture is shown here for the purposes of clarity.

Figure 12:
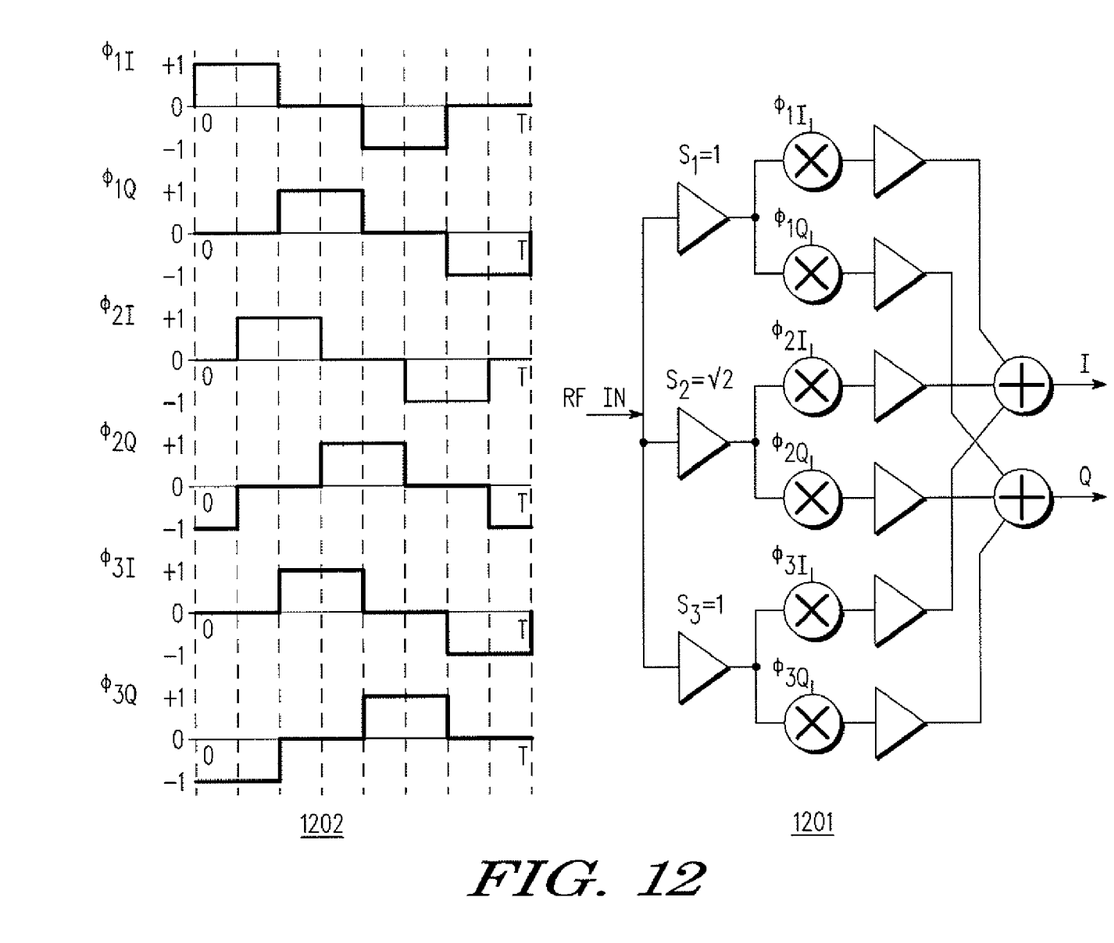
FIG. 12 comprises a block diagram and corresponding switching waveforms in accordance with various embodiments of the invention.

This harmonic suppression concept can also be applied to the realization of a low noise IQ mixer 1201 where separate I and Q outputs are formed as shown in FIG. 12. By implementing the specific mixer switching waveforms 1202 also shown in FIG. 12, a 3 dB increase in conversion gain and correspondingly lower noise is realized over the prior art which typically uses multiple square wave switching waveforms each delayed by a multiple of $\frac{1}{8}^{th}$ of the local oscillator period. These square wave switching waveforms used in the prior art cause each transconductor to always drive both I and Q paths at the same time. This divides the transconductor output current into each I and Q path by two and reduces the signal gain in each of the prior art I and Q paths by 6 dB. Referring still to FIG. 12, however, here, the mixer switching waveforms shows that each transconductor only drives one I or Q path at a time. It can be shown with a Fourier series expansion that the power in the fundamental frequency of each waveform shown in FIG. 12 is only 3 dB less than the power in the fundamental frequency of a square wave and consequently the signal gain in each of the I and Q paths is only reduced by 3 dB.

Those skilled in the art will recognize and appreciate that, pursuant to these teachings, a current domain input to a filter is converted to a voltage via a transimpedance amplifier and then filtered. A differential voltage is maintained by maintaining the transimpedance amplifiers and its loads as being fully differential. In the current domain the same filter and gain functions as well as a differential output are maintainable with a single load driven by a differential current. This, in turn, allows the entire filter area to be reduced by at least fifty percent as corresponds to a similar reduction in required capacitance. These teachings will further be seen to enable a current to be delivered to the filter load without impacting the preceding low noise amplifier/mixer performance. Furthermore, the described current-to-voltage converter will be understood to not impact the overall noise performance or linearity of this receiver by providing only a low impedance input to the mixer.

In one embodiment, a receiver includes an antenna input configured and arranged to operably couple to an antenna, a filter having a filter input operably coupled to the antenna input and a filter output, and a voltage-to-current converter having an input operably coupled to the filter output and a voltage-to-current converter output. The receiver also includes a down frequency conversion mixer having a mixer input operably coupled to the voltage-to-current converter output and a mixer output and a current-to-voltage converter having an input operably coupled to the mixer output and a current-to-voltage converter output. The current-to-voltage converter comprises an amplifier having a current gain of substantially unity or less.

In another embodiment, a method includes receiving a signal from an antenna output, filtering the signal to provide a filtered signal, and converting at least one voltage-based signal as corresponds to the filtered signal to provide at least one corresponding current-based signal. The method also includes mixing the at least one corresponding current-based signal with a reference signal to provide at least one mixed-down current-based signal and converting the mixed-down current-based signal to provide at least one corresponding voltage-based signal using a current-to-voltage converter. The current-to-voltage converter comprises a converter having a current gain of substantially unity or less.

In another embodiment, a receiver includes a plurality of voltage-to-current converters each having a voltage-to-current converter output, a plurality of down frequency conversion mixers each having a mixer input operably coupled to a corresponding voltage-to-current converter output and a corresponding mixer output, and a plurality of current-to-voltage converters each having an input operably coupled to only one of the mixer outputs and a corresponding current-to-voltage converter output. The current-to-voltage converter comprises a converter having a current gain of substantially unity or less.

In another embodiment, an integrated circuit includes an antenna input configured and arranged to operably couple to an antenna, a filter having a filter input operably coupled to the antenna input and a filter output, and a voltage-to-current converter having an input operably coupled to the filter output and a voltage-to-current converter output. The integrated circuit includes a down frequency conversion mixer having a mixer input operably coupled to the voltage-to-current converter output and a mixer output, and a current-to-voltage converter having an input operably coupled to the mixer output and a current-to-voltage converter output. The current-to-voltage converter output does not feed back to the input of the current-to-voltage converter via a capacitor.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A receiver comprising:
an antenna input configured and arranged to operably couple to an antenna;
a filter having a filter input operably coupled to the antenna input and a filter output;
a voltage-to-current converter having an input operably coupled to the filter output and a voltage-to-current converter output;
a down frequency conversion mixer having a mixer input operably coupled to the voltage-to-current converter output and a mixer output;
a current-to-voltage converter having an input operably coupled to the mixer output and a current-to-voltage converter output, wherein the current-to-voltage converter comprises an amplifier having a current gain of substantially unity or less;
an integrator operably coupled to the current-to-voltage converter output, wherein the integrator includes an output that is operably coupled via a feedback path to provide a feedback signal to a terminal of the current-to-voltage converter, wherein the integrator includes an amplifier.

2. The receiver of claim 1 wherein the current-to-voltage converter output connects to at least one capacitor.

3. The receiver of claim 2 wherein the current-to-voltage converter output comprises a differential output having the at least one capacitor connected there across.

4. The receiver of claim 3 wherein the current-to-voltage converter output comprises a differential output having at least one resistor connected there across.

5. The receiver of claim 3 further comprising at least two feedback paths that provide a feedback signal to the input of the current-to-voltage converter wherein the at least two feedback paths do not comprise, even in part, a capacitor.

6. The receiver of claim 1 wherein the integrator output does not feed back to the input of the current-to-voltage converter via a capacitor.

7. The receiver of claim 1 wherein the integrator output is operably coupled via the feedback path to provide a feedback signal to the input of the current-to-voltage converter.

8. The receiver of claim 7 wherein the feedback path does not comprise, even in part, a capacitor.

9. The receiver of claim 1 wherein the integrator output is operably coupled via the feedback path to provide a feedback signal to the output of the current-to-voltage converter.

10. The receiver of claim 9 wherein the feedback path does not comprise, even in part, a capacitor.

11. The receiver of claim 1 wherein:
the voltage-to-current converter comprises a plurality of voltage-to-current converters each having an input operably coupled to the filter output and a corresponding voltage-to-current output;
the down frequency conversion mixer comprises a plurality of down frequency conversion mixers each having a mixer input operably coupled to a corresponding voltage-to-current converter output and a corresponding mixer output;
the current-to-voltage converter comprises a plurality of current-to-voltage converters each having an input operably coupled to only one of the mixer outputs and a corresponding current-to-voltage converter output, wherein each current-to-voltage converter comprises an amplifier having a current gain of substantially unity or less.

12. The receiver of claim 11 wherein the plurality of current-to-voltage converters have their current-to-voltage converter outputs coupled in common to provide a shared output.

13. A method comprising:
receiving a signal from an antenna output;
filtering the signal to provide a filtered signal;
converting at least one voltage-based signal as corresponds to the filtered signal to provide at least one corresponding current-based signal;
mixing the at least one corresponding current-based signal with a reference signal to provide at least one mixed-down current-based signal;
converting the mixed-down current-based signal to provide at least one corresponding voltage-based signal using a current-to-voltage converter, wherein the current-to-voltage converter comprises a converter having a current gain of substantially unity or less;
integrating the at least one corresponding voltage-based signal to provide an integrated signal and applying at least a portion of the integrated signal to the input of the current-to-voltage converter, wherein the integrating includes integrating with an integrator that includes an amplifier having an input operably coupled to an output of the current-to-voltage converter.

14. The method of claim 13 wherein converting the mixed-down current-based signal to provide at least one corresponding voltage-based signal using a current-to-voltage converter further comprises using a current-to-voltage converter having at least one capacitor connected across a differential output of the current-to-voltage converter.

15. The method of claim 13 wherein converting the mixed-down current-based signal to provide at least one corresponding voltage-based signal using a current-to-voltage converter further comprises using a current-to-voltage converter having an output that does not feed back to an input of the current-to-voltage converter via a capacitor.

16. The method of claim 13 wherein integrating the at least one corresponding voltage-based signal to provide an integrated signal and applying at least a portion of the integrated signal to the input of the current-to-voltage converter comprises integrating the at least one corresponding voltage-based signal to provide an integrated signal and applying at least a portion of the integrated signal to the input of the current-to-voltage converter without a capacitor.

17. A receiver comprising:
a plurality of voltage-to-current converters each having a voltage-to-current converter output;
a plurality of down frequency conversion mixers each having a mixer input operably coupled to a corresponding voltage-to-current converter output and a corresponding mixer output;
a plurality of current-to-voltage converters each having an input operably coupled to only one of the mixer outputs and a corresponding current-to-voltage converter output, wherein the current-to-voltage converter comprises a converter having a current gain of substantially unity or less;
an integrator including an amplifier;
wherein the plurality of current-to-voltage converters have their current-to-voltage converter outputs coupled in common to provide a shared output, the shared output operably coupled to the input of the amplifier.

18. The receiver of claim 17 wherein the shared output comprises a differential output having at least one capacitor connected there across.

19. An integrated circuit comprising:
an antenna input configured and arranged to operably couple to an antenna;
a filter having a filter input operably coupled to the antenna input and a filter output;
a voltage-to-current converter having an input operably coupled to the filter output and a voltage-to-current converter output;
a down frequency conversion mixer having a mixer input operably coupled to the voltage-to-current converter output and a mixer output;
a current-to-voltage converter having an input operably coupled to the mixer output and a current-to-voltage converter output;
an integrator including an amplifier, the current-to-voltage converter output is operably coupled to an input of the amplifier of the integrator;
wherein output of the amplifier is fed back to the input of the current-to-voltage converter but does not feed back to the input of the current-to-voltage converter via a capacitor.

20. A receiver of claim 1 wherein:
the current-to-voltage converter output comprises a differential output including a first output terminal operably coupled to a first input of the amplifier and a second output terminal operably coupled to a second input of the amplifier;
the amplifier comprising a differential output including a first output terminal operably coupled to the terminal of the current-to-voltage amplifier and a second output terminal operably coupled to a second terminal of the current-to-voltage amplifier.

21. A receiver of claim 20 wherein the terminal of the current-to-voltage amplifier is characterized as the input of the current-to-voltage amplifier and the second terminal of the current-to-voltage amplifier is characterized as a second input of the current-to-voltage amplifier.

* * * * *